（12） United States Patent
Balducci et al.

(10) Patent No.: US 12,447,652 B2
(45) Date of Patent: Oct. 21, 2025

(54) COMPRESSION MOULDING MACHINE AND METHOD

(71) Applicant: SACMI COOPERATIVA MECCANICI IMOLA SOCIETA' COOPERATIVA, Imola (IT)

(72) Inventors: Massimo Balducci, Imola (IT); Fabrizio Pucci, Castelguelfo (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 123 days.

(21) Appl. No.: 17/999,318

(22) PCT Filed: May 20, 2021

(86) PCT No.: PCT/IB2021/054362
§ 371 (c)(1),
(2) Date: Nov. 18, 2022

(87) PCT Pub. No.: WO2021/234617
PCT Pub. Date: Nov. 25, 2021

(65) Prior Publication Data
US 2023/0182355 A1   Jun. 15, 2023

(30) Foreign Application Priority Data
May 21, 2020  (IT) .................. 102020000011947

(51) Int. Cl.
*B29C 43/58*    (2006.01)
*B29C 43/02*    (2006.01)
*B29C 43/36*    (2006.01)

(52) U.S. Cl.
CPC .............. *B29C 43/58* (2013.01); *B29C 43/02* (2013.01); *B29C 2043/3689* (2013.01); *B29C 2043/5875* (2013.01); *B29C 2793/0081* (2013.01)

(58) Field of Classification Search
None
See application file for complete search history.

(56) References Cited

U.S. PATENT DOCUMENTS

| 2005/0080507 A1* | 4/2005 | Silberg .................... B29C 48/92 |
| | | 700/196 |
| 2014/0010906 A1 | 1/2014 | Yonesato et al. |

(Continued)

FOREIGN PATENT DOCUMENTS

| CN | 104169072 A | 11/2014 |
| CN | 107750204 A | 3/2018 |

(Continued)

OTHER PUBLICATIONS

International Search Report issued in International Application No. PCT/IB2021/054362 dated Aug. 11, 2021.

(Continued)

*Primary Examiner* — Michael M. Robinson
(74) *Attorney, Agent, or Firm* — UNITED IP COUNSELORS, LLC

(57) ABSTRACT

A compression moulding machine comprises: an extrusion unit configured to extrude a rod of pasty polymeric material; a cutting element, configured to portion the rod into individual charges; a rotary carousel, including a plurality of moulds, each mould being configured to receive a respective charge and to form a corresponding object from the charge; a feeder, configured to convey each charge to a respective (Continued)

mould at a feed position; an inspecting device, configured to capture inspection data, representing a composition of the rod or of the charges.

21 Claims, 4 Drawing Sheets

(56) References Cited

U.S. PATENT DOCUMENTS

| | | | |
|---|---|---|---|
| 2016/0009014 A1* | 1/2016 | Schmitz | B29C 48/92 |
| | | | 425/135 |
| 2018/0128738 A1 | 5/2018 | Bosi | |
| 2020/0408514 A1* | 12/2020 | Heil | G01N 23/083 |
| 2021/0237320 A1* | 8/2021 | Fazziani | B29C 43/58 |

FOREIGN PATENT DOCUMENTS

| | | |
|---|---|---|
| EP | 3362243 A1 | 8/2018 |
| EP | 3 508 324 A1 | 7/2019 |
| WO | 2013/098724 A1 | 7/2013 |
| WO | 2019207420 A1 | 10/2019 |

OTHER PUBLICATIONS

Written Opinion issued in International Application No. PCT/IB2021/054362 dated Aug. 11, 2021.

Jun. 12, 2025, Chinese Office Action issued in Chinese Application No. 202180036762.5 (CN103459117 cited in the Office Action corresponds to previously cited US 2014/0010906 A1; US 2016/0009014 A1 was made of record by the Examiner).

\* cited by examiner

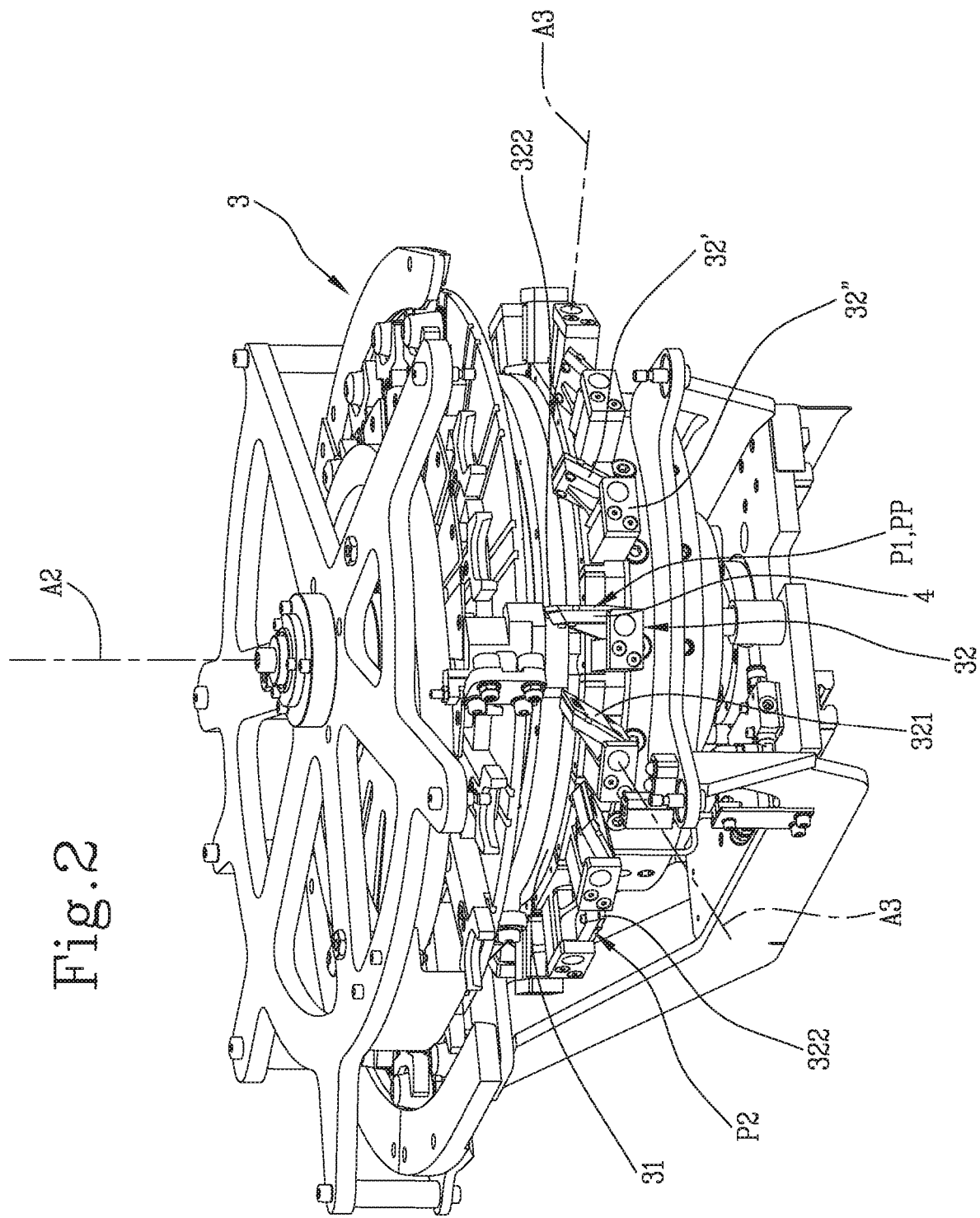

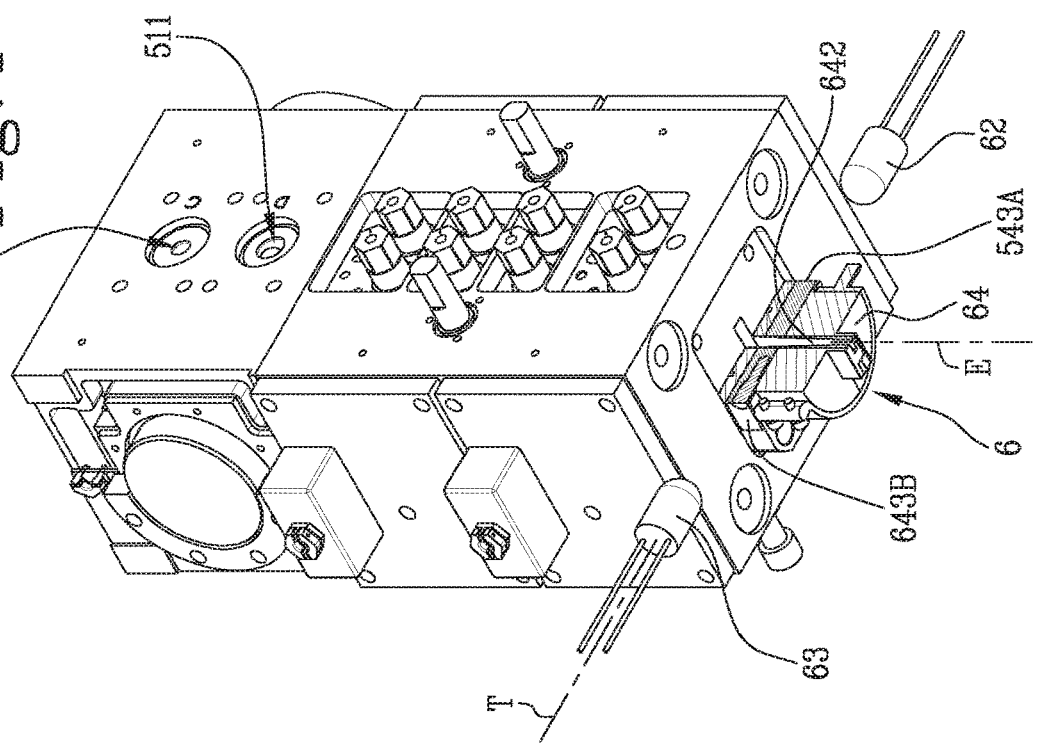
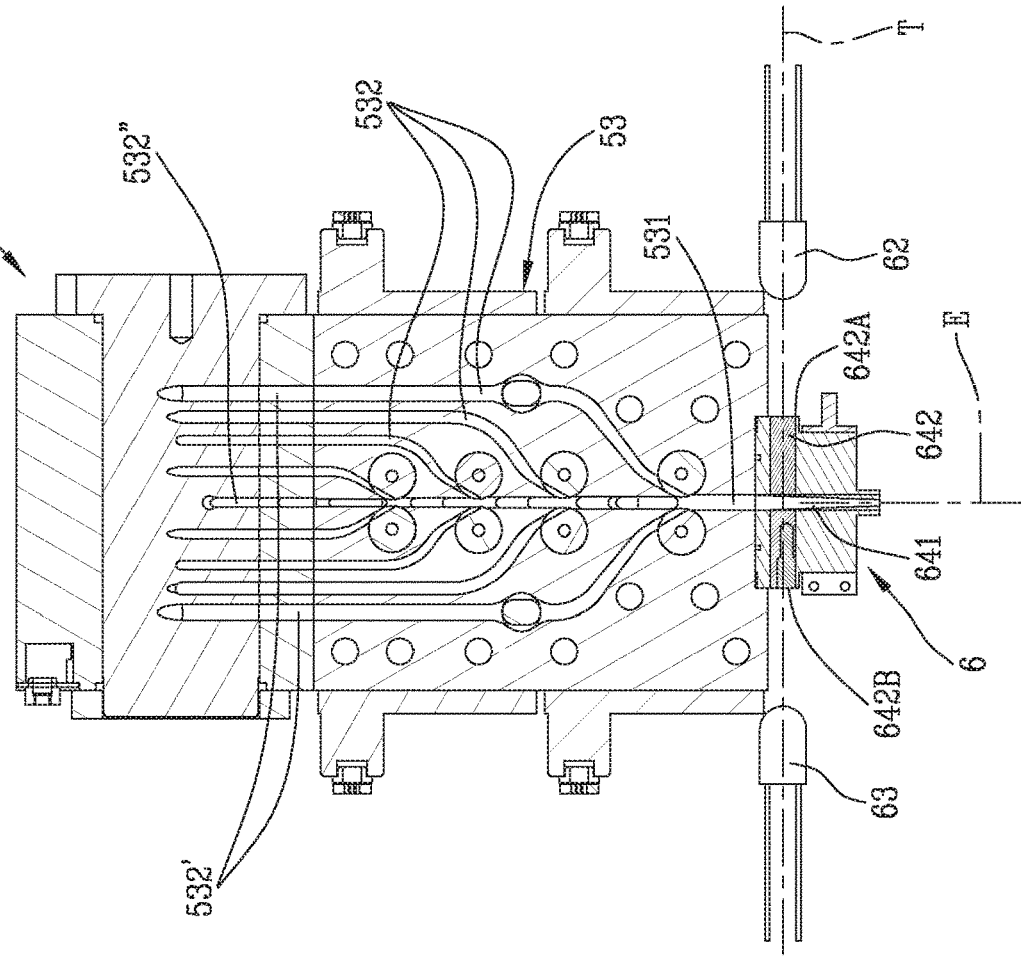

COMPRESSION MOULDING MACHINE AND METHOD

TECHNICAL FIELD

This invention relates to a compression moulding machine and to a compression moulding method.

BACKGROUND ART

Compression moulding machines are machines configured to form objects, generally of plastic, from corresponding charges of pasty material. Moulding machines are equipped with one or more moulds, whose shape defines the final shape of the object under production. More specifically, the charge is placed between a first (male) portion of the mould and a second (female) portion of the mould. The first and second portions move towards each other to define an expansion chamber in which the pasty charge can expand to adopt the predetermined shape.

Also known are rotary moulding machines, where the moulds are disposed on a rotary carousel, angularly spaced from each other. These moulding machines are equipped with feeders each of which conveys an individual charge to each mould on the carousel. The feeders are located downstream of an extruder and of a portioning element. The extruder extrudes a continuous rod of pasty material whilst the portioning element cuts the rod into individual charges.

The quality of the final moulded object depends largely on the physical and chemical properties of the charge that is fed to the mould. More specifically, if the composition of the charge is not optimal—for example, the pasty material has a non-uniform consistency—the quality of the plastic object may be negatively affected because the charge does not expand correctly.

The problem is all the more evident if the rod is composed of two or more materials having different functions and properties. For example, in plastic objects with barrier layers to make the internal space impermeable to oxygen, a charge that does not conform to standards may spoil the efficacy of the barrier.

Moreover, in some cases, there is a compatibilizing layer which should not come into contact with foods. The problem may be felt even more strongly when there are compostable materials which are soluble in water and which must therefore be incorporated into other materials which are impermeable to water.

In such contexts, the relative position between the materials the rod is made of may significantly affect the quality of the end product.

Known in the prior art are moulding machines that comprise quality inspection stations but only downstream of the mould carousel. The risk, therefore, is that attention is drawn to non-conformity when it is too late to take action and the only solution is to reject the object.

The following documents disclose examples of a moulding machine and of a moulding method with the above mentioned drawbacks: WO2019207420 of the self-same Applicant, US2014010906A1 and EP3362243A1.

DISCLOSURE OF THE INVENTION

This invention has for an aim to provide a moulding machine and a moulding method to overcome the above mentioned disadvantages of the prior art.

This aim is fully achieved by the machine and method of this disclosure as characterized in the appended claims.

According to one aspect of it, this disclosure provides a compression moulding machine.

The machine comprises an extrusion unit. The extrusion unit is configured to extrude a rod of pasty polymeric material.

The machine comprises a cutting element (or portioning element). The cutting element is configured to portion the rod into individual charges.

The machine comprises a mould configured to receive a respective charge and to form a corresponding object of polymeric material from the charge. It should be noted that the term "mould" as used in this disclosure denotes a single unit that moulds a single object from a single charge.

In an embodiment, the machine comprises a rotary carousel. The rotary carousel includes an additional mould to form a plurality of moulds. Each mould is configured to receive a respective charge. Each mould is configured to form a corresponding object of polymeric material from the charge.

The machine comprises a feeder. The feeder is configured to convey each charge to a respective mould at a feed position.

The machine comprises an inspecting device. The inspecting device is configured to capture inspection data, representing one or more chemical or physical properties of the rod or of the charge: for example, but not necessarily, chemical/physical composition, density or thickness. The inspecting device is configured to capture inspection data, representing a composition (chemical or physical) of the rod or of the charges.

The presence of the inspecting device, which detects the composition of the rod or of the charges, allows obtaining information on the quality of the charge or of the rod before the object is actually moulded, thus making it possible to take action if the charge or the rod is not up to standard.

In an embodiment, the inspecting device is located in an inspection zone between the feed position and the extrusion unit.

In an embodiment, the inspection zone is located between the extrusion unit and the cutting element, so that the rod is inspected before being cut.

In an embodiment, the inspection zone is located between the feed position and the cutting element and the inspecting device is configured to inspect the charge.

The rod of plastic material includes a first material. In one example, the rod further includes a second material. In this example, the apparatus is configured to inspect the rod to sense (detect) the presence of the first material or of the second material. In other examples, the apparatus is configured to inspect the presence of the first material and of the second material.

In an embodiment, the extrusion unit includes a first extruder, configured to extrude a first pasty material.

In an embodiment, the extrusion unit includes a second extruder, configured to extrude a second pasty material.

In an embodiment, the extrusion unit includes a co-extruder. The co-extruder is configured to receive the first material and the second material from the first and the second extruder, respectively. The co-extruder is configured to extrude the rod, which comprises the first and the second material.

In an embodiment, the inspecting device is configured to detect a presence of the second material in the rod.

Thanks to the inspecting device, therefore, it is possible to check that the second material is actually present and that the extrusion process was carried out without problems.

In an embodiment, the co-extruder is configured to extrude a first layer, formed from the first material. The co-extruder is configured to extrude a second layer, formed from the second material. The co-extruder is configured to extrude a third layer, formed from the first material. In an embodiment, the first layer, the second layer and the third layer lie on top of each other to form the rod.

In one embodiment, therefore, the rod has a layered, planar shape. In other embodiments, the rod has a cylindrical (string-like) shape. In this embodiment, the first layer of the rod is a hollow cylinder formed from the first material and the second layer is a solid cylinder formed from the second material and inserted into the cavity of the first layer.

In a further embodiment, the rod has a cylindrical shape and comprises:
- a first, hollow outer cylinder which defines the first layer of the rod formed from the first material;
- a second, hollow outer cylinder which defines the second layer of the rod formed from the second material;
- a solid cylinder, which defines the third layer of the rod, formed from the first material.

Generally speaking, the rod may have a cylindrical shape and may comprise a plurality of layers, each defined by a respective hollow cylinder of plastic material or a respective solid cylinder of plastic material.

Further, in another embodiment, the rod comprises a cylindrical layer formed from the first material in which a plurality of beads made from the second material are embedded. The plurality of beads are spaced along the extrusion direction.

In an embodiment, the co-extruder is configured to extrude the second material intermittently in the rod along an extrusion direction to define portions of the second material spaced along the extrusion direction. In this embodiment, therefore, the rod includes zones without the second material through the entire cross section of the rod.

In an embodiment, the co-extruder is configured to extrude the second material intermittently in such a way that the first material completely surrounds the second material: that is to say, in such a way that the outside surface of the rod is defined by the first material only.

The system for making a rod with the second material extruded intermittently is described exhaustively in patent 102019000018530 to the present Applicant and is incorporated herein by reference.

In an embodiment, the inspection data represent an absence of the second material at specific inspection points on the rod.

In other words, the inspecting device is configured to inspect the rod in zones where the second material is not supposed to be, so as to check that the second material is distributed correctly in the rod. This feature, therefore, ensures that the charge is not found to be non-conformant to standards after cutting. An example of this advantage is evident in the case where the rod is composed of a first material, configured to define the outside surface of the end product, and a second material which defines an oxygen barrier for the end product (coffee capsules for example). The second material is sensitive to contact with air and must therefore always be surrounded by the first material. The inspecting device thus ensures that the second material is correctly surrounded by the first material and will not therefore be damaged by contact with air.

In an embodiment, the inspection points include a first group of points. The first group of points is interposed between two successive portions of the second material along the extrusion direction. Thus, the first group of inspection points is used to check for the presence of a cutting zone where only the first material is present, between two zones where the second material is present. In an embodiment, the inspection points include a second group of points, located on the outside of the second material along a direction transverse to the extrusion direction. More specifically, in an embodiment, the second group of points is interposed between an edge of the first material and an edge of the second material.

In an embodiment, the extension of the first layer along a direction transverse to the extrusion direction is greater than the transverse extension of the second layer, so that the first layer can surround the sides of the second layer.

The machine comprises a control unit.

In an embodiment, the control unit is configured to receive inspection data from the inspecting device. In an embodiment, the control unit is configured to control the cutting element as a function of the inspection data. This feature allows controlling the cutting of the rod as a function of the information relating to the rod itself. That way, the control unit is configured to command the cutting element to cut the rod at a section where there is no second material: that is to say, the cutting section mentioned above.

The machine comprises a rejection device, configured to reject the charge and/or the final object.

In an embodiment, the control unit is connected to the rejection device to instruct it to reject a specific charge and/or a specific object, as a function of the inspection data.

In an embodiment, the inspecting device is configured to inspect the rod at a position upstream of the cutting element. This feature, combined with the possibility of controlling the cutting element as a function of the inspection data, allows adapting the cutting of the charge as a function of the inspection data.

In one example, the inspection device is configured to feel the an emission of electromagnetic waves made by the first material and/or of the second material of the rod (and/or the charge). In other examples, the inspection device is configured to feel an absorption of electromagnetic waves made by the rod and/or the charge, which is invested by said waves and which absorbs a part of the waves having specific features (in terms of waves length and frequency).

For example, the inspecting device may be configured to direct a beam of electromagnetic waves at the rod and/or at the charge. In an embodiment, the inspecting device is configured to detect the extent to which the beam of electromagnetic waves is absorbed by the rod and/or the charge. In another example, the system is configured to detect electromagnetic waves emitted by the rod or charge (e.g. IR emission in view of the temperature of the rod or charge).

In an embodiment, the inspecting device comprises an emitter. The emitter is configured to emit the beam of electromagnetic waves. The emitter is positioned laterally of the rod relative to the extrusion direction. In an embodiment, the inspecting device comprises a receiver, configured to receive the beam of electromagnetic waves. The receiver is positioned laterally of the rod relative to the extrusion direction. The emitter and the receiver are positioned on opposite sides of the rod (preferably spaced from the rod).

The receiver and the emitter are aligned along a direction of emission.

The inspecting device comprises a slide channel in which the rod is slidable. The slide channel is open to the outside through an outlet nozzle. The slide channel may protrude from the co-extruder or it may be integrated therein. The outlet nozzle has a cross section transverse to the extrusion direction. The transverse cross section of the outlet nozzle has a defined geometrical shape which may, by way of example, be circular, rectangular or generally prismatic.

The transverse cross section of the outlet nozzle defines the shape, hence the thickness, of the rod. The slide channel is therefore configured to convey the rod towards the outlet nozzle to shape it to predetermined dimensional specifications. In this embodiment, therefore, the rod slides in contact with (rubs against) the inside walls of the slide channel.

The extrusion unit comprises an inspection opening. The inspection opening is preferably perpendicular to the direction of emission. The inspecting device comprises an inspection track, preferably transverse. The inspection track is preferably perpendicular to the feed channel. The inspection track is aligned with the emitter and with the receiver along a direction of emission.

It should be noted that in an embodiment, the inspecting device is configured to inspect the rod at a position downstream of the slide channel: that is to say, in the absence of walls or windows interposed between the emitter or receiver and the rod. For example, the emitter and the receiver may be located downstream of the outlet nozzle along the extrusion direction, so as to intercept the rod as soon as it comes out of the co-extruder and before it is portioned.

The direction of emission is inclined to the extrusion direction at an angle of incidence. In an embodiment, the direction of emission is perpendicular to the direction of extrusion and the angle of incidence measures 90°.

In an embodiment, the angle of incidence is between 5° and 90°.

In an embodiment, the inspecting device is configured to vary the direction of emission as a function of the properties of the rod (chemical/physical composition, thickness and/or density) so as to vary the angle of incidence. In other words, the angle of incidence is variable as a function of rod properties (chemical/physical composition, thickness and/or density).

In an embodiment, the beam of electromagnetic waves is an X-ray beam. The wavelength of the electromagnetic beam is between 10 nm and 1 pm. The X-rays can be used not only to check for the presence of a material but also to assess the composition of the material to check its quality or that it matches a reference composition.

Furthermore, use of X-rays also allows inspecting charges with a large thickness, where other types of electromagnetic waves (for example, infrared cameras) are unable to work.

Lastly, another advantage over other types of inspecting systems lies in the fact that assessment is independent of colour but is based on a physical (or chemical/physical) analysis of the materials.

In an embodiment, the cutting element is located on the feeder. In an embodiment, the cutting element comprises a retaining surface. The retaining surface is configured to keep hold of the charge obtained by portioning the rod.

In an embodiment, the inspecting device is configured to derive inspection data for each of the inspection points.

In an embodiment, the plurality of inspection points defines an uninterrupted inspection line along the extrusion direction.

The inspection points may be located in the following zones:
  in a frame zone, around the outside of the second material, to check that the second material is effectively not present in that zone;
  in a presence zone, to check that the second material is effectively present in that zone.

This embodiment allows having a continuous function of the composition of the rod relative to the coordinate defined by the extrusion direction. This is very advantageous because it also allows determining an extension of a cutting stretch: that is, the stretch without the second material. In effect, an assessment performed at a single inspection point might be subject to errors, indicating that the material is absent but not providing any information as to the extension of the cutting stretch along the extrusion direction.

According to an aspect of it, this disclosure provides a method for making an object of polymeric material by compression moulding.

The method comprises a step of extruding a rod of pasty polymeric material through an extrusion unit. The method comprises a step of cutting the rod to obtain individual charges. The method comprises a step of feeding the charge to a respective mould at a feed position.

The method comprises a step of forming the object by moulding the individual charges in respective moulds.

In an embodiment, the method comprises a step of inspecting. In the step of inspecting, the inspecting device captures inspection data, representing a composition of the rod or of the charges.

In an embodiment, in the step of extruding, the rod is extruded with a first pasty material and a second pasty material. In the step of inspecting, the inspecting device detects a presence of the second material in the rod.

In an embodiment of the method, in the step of extruding, the second material is included intermittently in the rod along an extrusion direction, along which the rod exits the extrusion unit, to define portions of the second material spaced along the extrusion direction. Preferably, in the step of extruding, the second material is extruded with the first material which completely surrounds it so that, after the step of cutting, no part of the second material is exposed to the air.

In an embodiment, in the step of inspecting, the inspecting device detects an absence of the second material at specific inspection points on the rod. In other words, in the step of inspecting, the inspecting device checks that the second material has not been extruded in a cutting stretch, along the extrusion direction, where the second material is theoretically absent.

In the step of inspecting, the inspecting device (an emitter of the inspecting device) emits a beam of electromagnetic waves and the inspecting device (a receiver of the inspecting device) detects the extent to which the rod or the charges absorb the beam of electromagnetic waves. In an embodiment, in the step of inspecting, the electromagnetic wavelength of the beam emitted is between 10 nm and 1 pm.

BRIEF DESCRIPTION OF DRAWINGS

These and other features will become more apparent from the following description of a preferred embodiment, illustrated by way of non-limiting example in the accompanying drawings, in which:

FIG. 2 illustrates a detail showing an inspecting device of the moulding machine of FIG. 1;

FIG. 3 illustrates a detail showing an extrusion unit of the moulding machine of FIG. 1;

FIG. 4 illustrates a detail showing a feeder of the moulding machine of FIG. 1;

DETAILED DESCRIPTION OF PREFERRED EMBODIMENTS OF THE INVENTION

Figure 1:
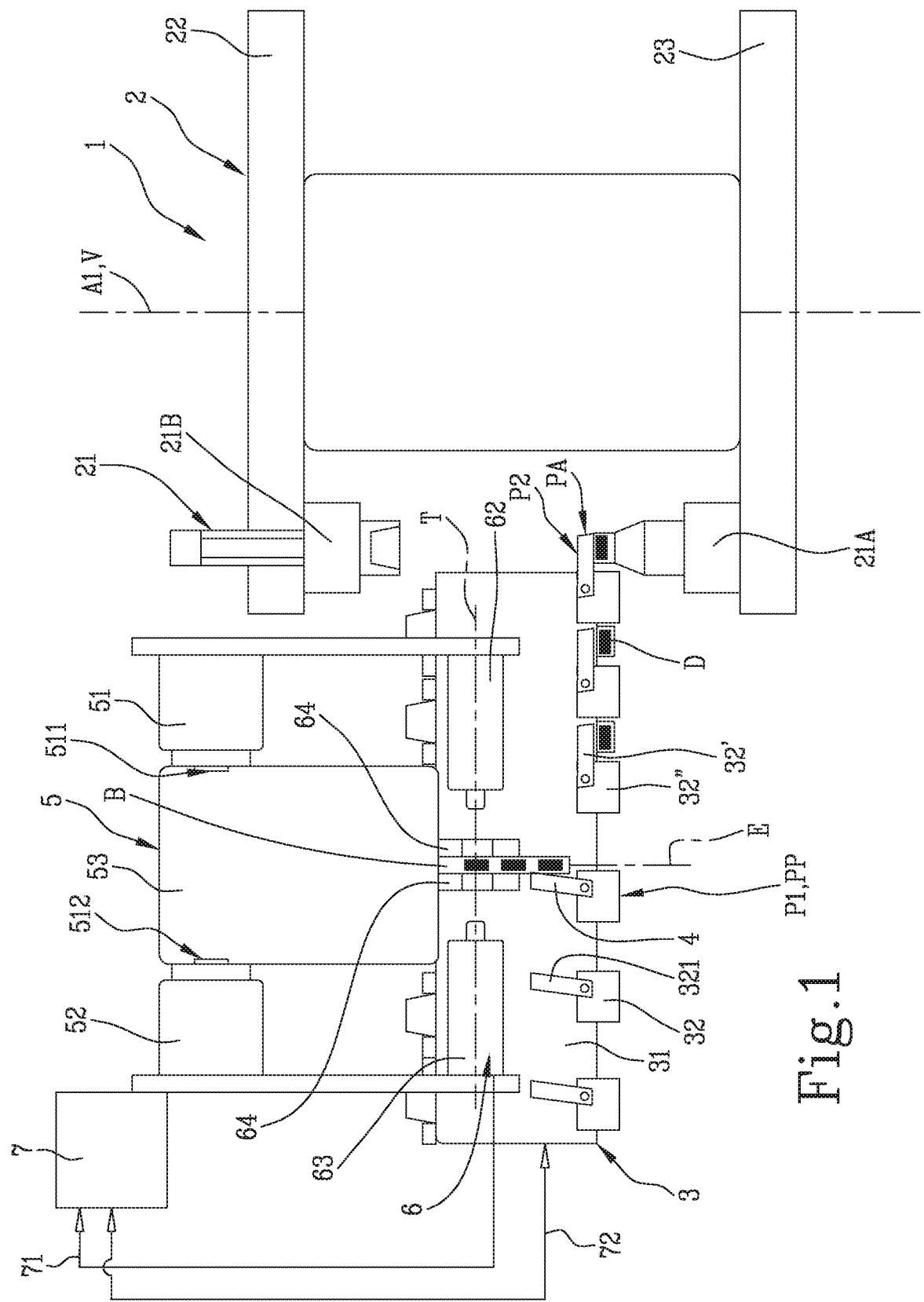
FIG. 1 schematically illustrates a compression moulding machine for making objects from corresponding charges of material.
Figure 6:
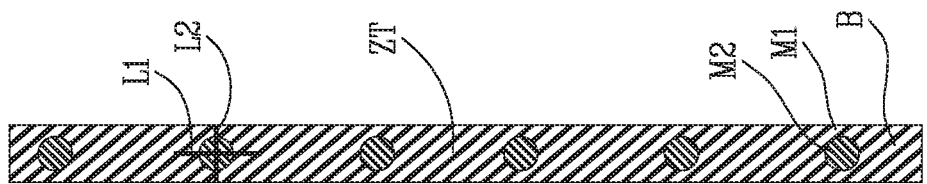
FIG. 6 schematically illustrates an embodiment of a rod processed by the moulding machine of FIG. 1.
Figure 5A:
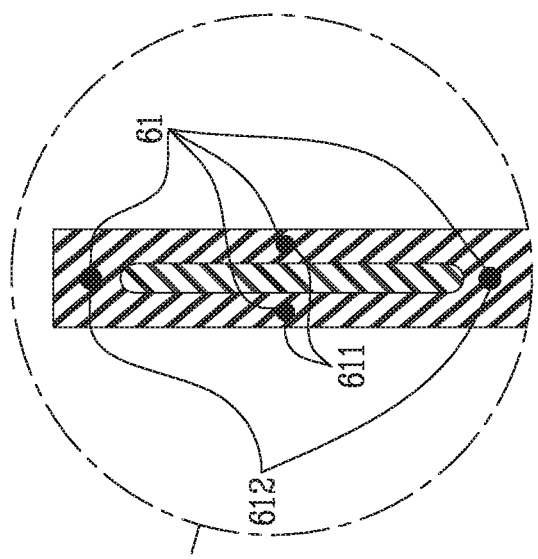
FIGS. 5 and 5A illustrate an embodiment of a rod processed by the moulding machine of FIG. 1 and a detail of the rod of FIG. 5, respectively.
Figure 5:
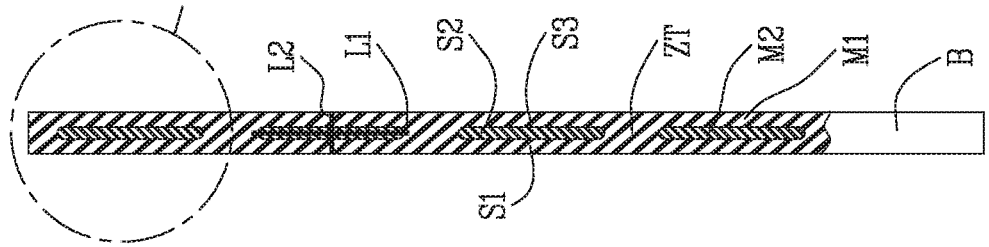

With reference to the accompanying drawings, the numeral 1 denotes a moulding machine for making objects.

The machine 1 comprises a rotary carousel 2. The rotary carousel 2 is configured to perform the moulding operation by rotating about a first axis of rotation A1. In an embodiment, the rotary carousel 2 comprises a plurality of moulds 21. Each mould of the plurality of moulds 21 is configured to receive a single charge D, preferably of polymeric material, and to mould a corresponding object from that single charge D. The moulds of the plurality of moulds 21 are angularly spaced from each other and are equidistant from the first axis of rotation A1.

Each mould 21 of the plurality of moulds comprises a respective first portion 21A (commonly called male 21A) and a respective second portion 21B (commonly called female 21B). The male 21A and the female 21B are movable relative to each other to perform moulding. More specifically, each mould 21 is movable between an open position and a closed position. At the open position, the male 21A and the female 21B are spaced apart, whilst at the closed position, the male 21A and the female 21B are in contact to define an expansion chamber into which the single charge D is configured to flow in such a way as to take on the shape of the object to be moulded.

The rotary carousel 2 comprises a first plate 22 and a second plate 23, which are parallel to, and spaced from, each other. Each female 21B is positioned on the first plate 22, whilst each male 21A is positioned on the second plate 23.

In an embodiment, the male 21A is stationary relative to the rotary carousel 2, whilst the female 21B is movable relative to the rotary carousel 2 towards and away from the male 21A. The female 21B is movable along the vertical direction V.

In this embodiment, the male 21A is positioned along a vertical orientation V, parallel to the orientation of the weight force, downstream of the female 21B in the direction of the weight force. Further, the single charge D is released into the respective mould 21 on the male 21A.

In an embodiment, the second plate 23 is positioned downstream of the first plate 22 along the vertical orientation in the direction of the weight force. In other embodiments, on the other hand, the first plate 22 is positioned downstream of the second plate 23 along the vertical orientation in the direction of the weight force.

This embodiment allows inspecting the single charge D positioned on the male 21A, visually or by suitable inspecting devices, before the charge is moulded.

It is understood that this disclosure is also intended to protect embodiments in which the female 21B is positioned under the male 21A along the vertical direction V.

The rotary carousel 2 is driven in rotation by a dedicated actuator, which is configured to set it in rotation. It should be noted that for each complete turn of the rotary carousel 2, each mould 21 produces a corresponding object.

Each mould 21 of the plurality of moulds, preferably each male 21A, is configured to receive the single charge D at a feed position PA.

The machine 1 comprises a feeder 3. The feeder 3 is configured to pick up a single charge D from a pickup position PP. The feeder 3 is configured to convey the single charge D from the pickup position PP to the feed position PA.

In an embodiment, the feeder 3 comprises a rotary disc 31 (or a rotary starwheel). The rotary disc 31 rotates about a second axis of rotation A2 parallel to the first axis of rotation A1.

The feeder 3 comprises a plurality of pickup devices 32. The plurality of pickup devices 32 are connected to the rotary disc 31. Each pick up device 32 is configured to pick up a single charge D at the pickup position PP. Each pick up device 32 is configured to keep the single charge D moving along the path from the pickup position PP to the feed position PA. According to an aspect of this disclosure, the pickup device 32 is configured to hold the single charge D by suction which applies a pickup force on it that holds it against the pickup device 32 along the path from the pickup position PP to the feed position PA.

In an embodiment, the pickup device 32 is configured to keep the single charge D directed in the same direction as the weight force. The pickup force is therefore opposite to the weight force.

The positioning of the single charge D on the pickup device 32 allows the single charge D to be suitably released onto the male 21A (or onto the female 21B) of the corresponding mould 21.

The machine 1 comprises a cutting element 4. The cutting element 4 is configured to cut (or portion) a rod B of pasty material, preferably polymeric, to obtain corresponding individual charges D. The cutting element 4 is located downstream of the pickup device 32 (of the feeder 3) or of the pickup position PP. In effect, upstream of the pickup device 32, the single charge D is not yet present and the material to be moulded is still in the form of a rod B.

In an embodiment, the cutting element 4 is a single blade, configured to portion the rod B into individual charges D, each of which is picked up by a corresponding pickup device 32.

In a preferred embodiment, the cutting element 4 is integrated in the pickup device 32. In this embodiment, the machine 3 comprises a cutting element 4 for each pickup device 32, to make a plurality of cutting elements 4. More specifically, in a particularly advantageous embodiment, the pickup device 32 and the cutting element 4 are integrated in a suction blade 32', configured to perform the functions of the cutting element 4 and of the pickup device 32: that is to say, to portion the rod B and to hold the single charge D just obtained. In this embodiment, therefore, the machine 1 comprises a plurality of suction blades 32'.

According to this embodiment, each suction blade 32' is hinged to a respective support block 32", which is in turn connected to the rotary disc 31. More specifically, the support blocks 32" are connected to the rotary disc 31 at respective positions equidistant from the second axis of rotation A2.

Each suction blade 32' comprises a suction surface 321 which has a substantially planar shape. The suction surface 321 comprises a plurality of holes 321', configured to allow air suction to be applied on and to hold the respective charge D.

Each suction blade 32' comprises a cutting edge 322. The cutting edge 322 is an edge of the suction surface. The cutting edge 322 is configured to sever the rod B to obtain therefrom a corresponding portion defining a single charge D.

Each suction blade 32' is configured to rotate about a respective cutting axis A3, between a cutting position P1, where the suction blade 32' is configured to sever a single charge D from the rod B, and a hold position P2, where the suction blade 32' is configured to hold by suction the charge D it has just severed from the rod B.

At the cutting position P1, each blade 32' is positioned with its suction surface 321 perpendicular to a horizontal plane, perpendicular to the second axis of rotation A2 (that is, to the orientation of the weight force). That way, as the rotary disc rotates, the blade collides with the rod and severs the charge D.

At the suction position P2, the suction surface 321 is parallel to a horizontal plane, perpendicular to the second axis of rotation A2 (that is, to the orientation of the weight force). At the suction position P2 of the suction blade 32', the machine 1 is configured to activate a compressor which allows the charge D to be held by suction through the plurality of holes 321'.

According to an aspect of this disclosure, the machine 1 comprises an extrusion unit 5. The extrusion unit 5 is configured to extrude the rod B of pasty material, preferably polymeric.

In an embodiment, the extrusion unit 5 is configured to extrude the rod with a single material. In other embodiments, the extrusion unit 5 is configured to extrude a pasty material composed of one or more different materials.

In an embodiment, the extrusion unit comprises a first extruder 51. The first extruder 51 is configured to extrude a first pasty material M1. The first pasty material M1 is, for example, the material that will constitute the outside and/or inside surface of the final object.

In an embodiment, the extrusion unit comprises a second extruder 52. The second extruder 52 is configured to extrude a second pasty material M2. The second pasty material M2 is, for example, the material that will constitute an inner layer (not open to the outside) of the final object, which has special properties: for example, impermeability to oxygen to increase the life of the products contained inside the final object.

In an embodiment, the second material is a material having the property of being impermeable to oxygen: for example, EVOH.

In an embodiment, the extrusion unit comprises a third extruder. The third extruder is configured to extrude a third pasty material (a compatibilizing material). The third material is, for example, the material located at an intermediate position, sandwiched between the first material M1 and the second material M2 and configured to make the first material M1 compatible with the second material M2.

In an embodiment, the machine 1 comprises a co-extruder 53. The co-extruder 53 is configured to receive the first material M1 and the second material M2 from the first extruder 51 and the second extruder 52, through a first feed port 511 and a second feed port 521, respectively. The co-extruder 53 is configured to extrude the rod B, which comprises the first material M1 and the second material M2. In addition, the co-extruder is also configured to receive the third, compatibilizing material to extrude it together with the first material M1 and with the second material M2.

An example of a co-extruder is described in document IT2019000018530, which is incorporated herein by reference.

In an embodiment, the co-extruder 53 comprises a co-extrusion channel 531. The co-extruder 53 comprises one or more injection channels 532 in communication with the extrusion channel 531 to convey a respective pasty material therein. The injection channels 532 are each configured to inject a respective material in pasty state into the extrusion channel 531. In an embodiment, the plurality of injection channels 532 comprises pairs of channels, disposed on opposite sides of the extrusion channel 531 and configured to inject the same pasty material. It is thus possible to create a rod B whose layers are symmetrical about the extrusion channel 531.

In an embodiment, the one or more injection channels 532 comprise a pair of channels 532' configured to inject the first material M1 into the extrusion channel 531. In an embodiment, the one or more injection channels 532 comprise at least one central channel 532" configured to inject the second material M2. The central channel 532" is configured to inject the second material intermittently so as to create a rod B in which the second material is intermittent along the direction of maximum extension of the rod. A more in-depth description of how the co-extruder works can be found in document IT2019000018530, which is incorporated herein by reference.

The co-extruder is therefore configured to extrude a rod that may be embodied in different ways, described below.

In a first embodiment, the rod B is of the flat, multilayer type, comprising: a first layer S1 made from the first material M1, a second layer S2 made from the second material M2 and a third layer S3 made from the first material again. A variant of the embodiment with the multilayer rod B includes two further compatibilizing layers: the first compatibilizing layer being located between the first layer and the second layer, and the second compatibilizing layer being located between the second layer and the third layer. In this embodiment, therefore, the rod B has a substantially rectangular cross section, along a plane perpendicular to the extrusion direction E (that is, along the direction of maximum extension of the rod B). In a second embodiment, the rod B is of the cylindrical, multilayer type—that is to say, having a substantially circular or oval or elliptical cross section, along a plane perpendicular to the extrusion direction E (that is, along the direction of maximum extension of the rod B). In this embodiment, the rod B comprises an outer layer (with a hollow, cylindrical shape) made from the first material M1 and an inner core, with a circular shape, made from the second material M2.

Each of the two embodiments of the rod B may then be of two types: with the second material M2 extruded uninterruptedly or with the second material M2 extruded intermittently. With uninterrupted extrusion of the second material M2, the second layer S2 or inner core is continuous along the extrusion direction E. With intermittent extrusion of the second material M2, the second layer S2 or inner core is intermittent along the extrusion direction E. In this case, the second layer S2 or inner core is formed by alternating the first material M1 and the second material M2.

The machine 1 comprises an inspecting device 6. The inspecting device 6 is configured to derive (to capture) inspection data 71, representing a composition of the rod B or of the charge D. The inspecting device 6 may be located at different positions in the machine 1 along the path of the rod B or of the charge D. More specifically, in an embodiment, the inspecting device 6 is located between the extrusion unit 5 and the cutting element 4 (or the suction blade 32'). Thus, the inspecting device is capable of detecting a composition of the rod B. In an embodiment, the inspecting device 6 is located downstream of the cutting element 4 (or of the suction blade 32') and upstream of the feed position PA, to detect the composition of each single charge D before it is fed to the respective mould 21.

The inspecting device 6 allows identifying a composition of the material the rod B or the charge D is made of, making it possible to check that the extruded pasty material meets design specifications.

In an embodiment, in the presence of one or more materials in the rod B or in the charge D, the inspection data 7 represent the presence of the first material M1 or the second material M2. In an embodiment, the inspection data 7 represent the relative position between the first material M1 and the second material M2 along the extrusion direction and/or along a transverse direction T, perpendicular to the extrusion direction E.

In an embodiment, the inspecting device 6 is configured to detect the composition of the rod B or of the charge D at a plurality of inspection points 61. The inspecting device 6 is therefore configured to detect if the second material M2 is present or not at the inspection points 61, whether open to the outside or located inside.

In an embodiment, the plurality of inspection points 61 are spaced from each other to allow performing a point-by-point inspection on the rod B or on the charge D.

In this embodiment, the plurality of points 61 is divided into a first group of points 611, which are spaced from each other along the transverse direction T.

The first group of points 611 allows determining an absence of the second material M2 at the sides of the rod B or of the charge D parallel to the extrusion direction E. At the same time, the inspection in the first group of points 611 allows determining the presence of the second material in the zone inside the rod B or of the charge D.

The plurality of points 61 is divided into a second group of points 612, which are spaced from each other along the extrusion direction E.

In the case where the second material M2 is extruded uninterruptedly, the second group of points 612 allows determining whether the second material M2 is effectively present along the full extension of the rod B or of the charge D along the extrusion direction E.

In the case where the second material M2 is extruded intermittently, the second group of points 612 allows determining an absence of the second material M2 at cutting zones ZT which should be free of the second material M2. At the same time, the inspection in the second group of points 612 allows determining the presence of the second material in full zones: that is to say, in zones including the second material M2. Inspection along the extrusion direction E therefore allows checking whether zones free of the second material M2 are effectively alternated with zones which include the second material M2.

In an embodiment, the inspection points of the plurality of inspection points 61 are not spaced and are aligned to define a first inspection line L1, substantially parallel to the extrusion direction E. In an embodiment, the inspection points of the plurality of inspection points 61 are not spaced and are aligned to define a second inspection line L2, substantially parallel to the transverse direction T.

Lastly, in a yet further embodiment, the plurality of inspection points 61 are close together to define an inspection surface that covers the entire surface of the rod B or of the charge D facing the inspecting device.

In an embodiment, the inspecting device 6 comprises an emitter 62, configured to emit electromagnetic waves, preferably X-rays. The inspecting device 6 comprises a receiver 63, configured to capture absorption data indicating (representing) the absorption of the electromagnetic waves by the rod B or the charge D.

It should be remembered that in the embodiment in which inspection occurs along a plurality of points spaced along the transverse direction T, the inspecting device 6 may be made according to two embodiments. In a first embodiment, the emitter 62 is movable along the transverse direction T. In addition, or alternatively, the inspecting device 6 comprises one or more emitters 62, spaced along the transverse direction T and configured to capture inspection data simultaneously.

In an embodiment, the inspecting device 6 comprises a guide block 64. The guide block 64 comprises a slide channel 641 in which the rod B slides along the extrusion direction E out of the co-extruder 53. The guide block 64 is connected to the extrusion unit 5, preferably at an exit of the co-extruder 53 through which the rod B is fed out.

The slide channel 641 extends along the extrusion direction E.

The guide block 64 comprises a transverse track 642. The transverse track 642 runs transversely all the way through the guide block 64 between a first window 642A, facing the emitter 62, and a second window 642B, facing the receiver 63.

The transverse track 642 crosses the slide channel 641.

In an embodiment, the transverse track 642 is open also on one side of the guide block 64 parallel to the transverse direction T and to the extrusion direction E.

In an embodiment, the guide block 64 comprises a first closure door 643A and/or a second closure door 643B. The first closure door 643A and/or the second closure door 643B are made of a material which allows the X-rays to pass through without being conditioned: for example, a transparent material.

In an embodiment, the emitter 62 is configured to emit X-rays (or the electromagnetic waves) in an inspection direction substantially perpendicular to the first window 642A and preferably parallel to the transverse direction T. The X-rays pass through the transverse track 642 and collide with the rod B which is moving along the slide channel 641.

The X-rays pass through the second window 642B and are captured by the receiver, which is aligned with the second window 642B along the transverse direction T.

In an embodiment, the machine 1 comprises a control unit 7. The inspecting device 6 is configured to send the inspection data 71 to the control unit 7.

The control unit 7 is configured to process the inspection data 71. The control unit is configured to generate corresponding command signals 72. The control unit is configured to send the command signals 72 to the cutting element 4 and/or to the pickup device 32 and/or to the rotary disc 31 and/or to the feeder 3.

In a particularly advantageous embodiment, where the rod B is of the type with the second material M2 extruded intermittently, the inspection data 71 represent the positions of the cutting zones along the extrusion direction E.

Thus, the control unit 7 is configured to generate the command signals 72 in such a way that the cutting element 4 makes the cut at the cutting zones ZT.

In addition, or alternatively, the machine 1 comprises a rejection station, located downstream of the rotary carousel 2. In this embodiment, the control unit 7 is configured to send the command signals 72 to the rejection station to instruct it to reject any objects found to be defective as a function of the inspection data 71.

According to an aspect of this disclosure, this patent provides a method for making an object of polymeric material by compression moulding.

The method comprises a step of setting a rotary carousel 2 in rotation, where the rotary carousel 2 rotates about a first axis of rotation A1.

The method comprises a step of moulding, in which a plurality of moulds 21, mounted on the rotary carousel, moulds objects from polymeric material. Each mould of the plurality of moulds 21 receives a single charge D, preferably of polymeric material, and moulds a corresponding object from that single charge D.

In the step of moulding, a male 21A and a female 21B of each mould move relative to each other. More specifically, the step of moulding comprises a step of moving each mould 21 between an open position, where the male 21A and the female 21B are spaced apart, and a closed position, where the male 21A and the female 21B are in contact to define an expansion chamber into which the single charge D flows in such a way as to take on the shape of the object to be moulded.

In an embodiment of the method, the male 21A remains fixed relative to the rotary carousel 2, whilst the female 21B moves towards and away from the male 21A. The female 21B moves along the vertical direction V.

The method comprises a step of releasing the charge, in which the single charge D is released into the respective mould 21 on the male 21A.

In other embodiments of the method, in which the female is located under the male along the direction of the weight force, the charge is released onto the female.

The method comprises a step of actuating, in which a dedicated actuator sets the rotary carousel 2 in rotation.

It should be noted that each complete rotation of the rotary carousel 2 corresponds to one step of moulding for each mould 21. Thus, in each complete turn of the rotary carousel, the number of objects made is equal to the number of moulds 21 mounted on the rotary carousel 2.

In the step of releasing the charge, each mould 21 of the plurality of moulds, preferably each male 21A, receives the single charge D at a feed position PA.

The method comprises a step of feeding. In the step of feeding, a feeder 3 picks up a single charge D from a pickup position PP. The feeder 3 conveys the single charge D from the pickup position PP to the feed position PA.

In the step of feeding, a rotary disc 31 (that is, a rotary starwheel) of the feeder 3 rotates about a second axis of rotation A2, parallel to the first axis of rotation A1.

The step of feeding comprises a step of picking up (that is, of holding). In the step of picking up, each pickup device of a plurality of pickup devices 32, connected to the rotary disc 31, picks up a single charge D at the pickup position PP. Each pickup device 32 keeps the single charge D moving along the path from the pickup position PP to the feed position PA. In an embodiment, the step of picking up comprises a step of applying suction. In the step of applying suction, the pickup device 32 holds the single charge D by suction which applies a pickup force on it that holds it against the pickup device 32 along the path from the pickup position PP to the feed position PA.

In an embodiment, the pickup device 32 keeps the single charge D directed in the same direction as the weight force.

The method comprises a step of cutting. In the step of cutting, a cutting element 4 cuts (that is, portions) a rod B of pasty material, preferably polymeric, to obtain corresponding individual charges D. In an embodiment, the step of cutting is performed by the cutting element 4 at a position downstream of the pickup device 32 (of the feeder 3) or of the pickup position PP.

In an embodiment, the cutting element 4 is a single blade which cuts the rod B into individual charges D, each of which is then picked up by a corresponding pickup device 32.

In an embodiment, the steps of cutting and holding are performed one after the other by a single unit (element, component), preferably a suction blade 32' which cuts (severs) the rod B and then holds the single charge D it has just cut. In this embodiment of the method, therefore, the step of cutting is performed by a plurality of suction blades 32'.

In this embodiment, each suction blade 32' rotates relative to a respective support block 32" about a corresponding hinge. Each support block 32" is connected to the rotary disc 31 at a respective position at the same distance from the second axis of rotation A2 as the other support blocks 32".

Each suction blade 32' comprises a suction surface 321 which holds the charge D by suction through a plurality of holes 321'.

Each suction blade 32' comprises a cutting edge 322 which severs the rod B to obtain therefrom a corresponding portion defining a single charge D. Each suction blade 32' rotates about a respective cutting axis A3, between a cutting position P1, where the suction blade 32' collides with the rod B and severs a portion defining a single charge D, and a hold position P2, where the suction blade 32' holds by suction the charge D it has just severed from the rod B.

At the suction position P2 of the suction blade 32', the machine 1 activates a compressor which allows the charge D to be held by suction through the plurality of holes 321'.

The method comprises a step of extruding, in which an extrusion unit 5 extrudes the rod B of pasty material, preferably polymeric.

In an embodiment, the extrusion unit 5 extrudes the rod with a single material. In other embodiments, the extrusion unit 5 extrudes a pasty material composed of one or more different materials.

In an embodiment of the method, the step of extruding comprises one or more of the following steps:
 firstly extruding a first pasty material M1 which, for example, will constitute the outside and/or inside surface of the final object;
 secondly extruding a second pasty material M2, preferably EVOH, which, for example, will constitute an inner layer (not open to the outside) of the final object, which has special properties: for example, impermeability to oxygen to increase the life of the products contained inside the final object;
 thirdly extruding a third material which is, for example, located at an intermediate position, sandwiched between the first material M1 and the second material M2 to make the first material M1 compatible with the second material M2;
 co-extruding the first material M1 and the second material M2 and, when necessary, the third material.

In the step of co-extruding, a co-extruder 53 receives the first material M1 and the second material M2 from a first extruder 51 and a second extruder 52, respectively. The co-extruder 53 extrudes the rod B, which comprises the first material M1 and the second material M2. In addition, the co-extruder also receives the third, compatibilizing material to extrude it together with the first material M1 and with the second material M2.

An example of the step of co-extruding is described in document IT2019000018530, which is incorporated herein by reference.

In the step of co-extruding, one or more injection channels 532 of the co-extruder 53, which are in communication with the extrusion channel 531 of the co-extruder 53, convey a respective pasty material into the extrusion channel 531. In an embodiment, in the step of co-extruding, pairs of channels of the one or more injection channels 532, disposed on opposite sides of the extrusion channel 531, inject the same pasty material. It is thus possible to create a rod B whose layers are symmetrical about the extrusion channel 531.

In the step of extruding, the one or more injection channels 532 comprise a pair of channels 532' which inject the first material M1 into the extrusion channel 531. In an embodiment, the one or more injection channels 532 comprise at least one central channel 532" which injects the second material M2 into the extrusion channel 531.

In an embodiment of the method, the central channel 532" injects the second material M2 intermittently so as to create a rod B in which the second material is intermittent along the direction of maximum extension of the rod. For this operation, there is an obstructing element to interact with the flow of the central channel 532" to momentarily interrupt the inflow of the second material M2. A more in-depth description of how the co-extruder works can be found in document IT2019000018530, which is incorporated herein by reference.

In an embodiment, the method comprises a step of inspecting. In the step of inspecting, an inspecting device 6 captures (derives) inspection data 71, representing a composition of the rod B or of the charge D. The step of inspecting may be performed, chronologically, at different positions in the production process that makes the objects from the rod B.

More specifically, in an embodiment, the step of inspecting is performed after the step of extruding and before the step of cutting. Thus, the inspecting device detects a composition of the rod B.

In an embodiment, the step of inspecting is performed after the step of cutting and before the step of moulding in the moulds 21. Thus, the inspecting device 6 detects the composition of each individual charge D before it is fed to the respective mould 21.

In an embodiment, in the step of inspecting, the inspection data 71 are compared with reference data to check that the extruded material meets design specifications.

In an embodiment, in the step of inspecting, the inspection data 71 are compared with reference data which are associated with specific positions on the rod B along an extrusion direction E (the main direction of extension of the rod B). In an embodiment, in the step of inspecting, the inspection data 71 are compared with reference data which are associated with specific positions on the rod B along a transverse direction T, perpendicular to the extrusion direction E (the main direction of extension of the rod B).

This allows check whether the first material M1 and/or the second material M2 are present and/or absent at specific positions along the extrusion direction E and/or along the transverse direction T.

In an embodiment, the inspection data represent a relative position between the first material M1 and the second material M2 along the extrusion direction and/or along a transverse direction T, perpendicular to the extrusion direction E.

In the step of inspecting, the inspecting device 6 detects the composition of the rod B or of the charge D at a plurality of inspection points 61. The inspecting device 6 therefore derives information as to whether the second material M2 is present or not at the inspection points, whether the second material M2 is open to the outside or located inside the rod B.

In an embodiment, the plurality of inspection points 61 define points that are spaced apart on the rod.

In an embodiment, the plurality of inspection points 61 define a first inspection line L1, substantially parallel to the extrusion direction E and/or a second inspection line L2, substantially parallel to the transverse direction T.

In an embodiment, the plurality of inspection points 61 define an inspection surface corresponding to the surface of the rod B facing towards the inspecting device 6.

In an embodiment of the method in which the points of the plurality of inspection points 61 are spaced apart, the inspecting device 6 captures the inspection data 61 from a first group of points 611, which are spaced apart along the transverse direction T, and/or from a second group of points 612, which are spaced apart along the extrusion direction E.

In the case where the second material M2 is extruded intermittently, the inspection data captured from the second group of points 612 indicate (provide information on or represent) an absence of the second material M2 at cutting zones ZT which should be free of the second material M2. At the same time, the inspection data captured from the second group of points 612 indicate (provide information on or represent) the presence of the second material in full zones: that is to say, in zones including the second material M2. Inspection along the extrusion direction E therefore allows checking whether zones free of the second material M2 are effectively alternated with zones which include the second material M2.

In the step of inspecting, an emitter 62 of the inspecting device 6 emits electromagnetic waves, preferably X-rays. A receiver 63 of the inspecting device 6 captures absorption data (refraction data) indicating (representing) the absorption of the electromagnetic waves by the rod B or the charge D.

In an embodiment of the method, the emitter is movable along the transverse direction T to capture the inspection data 71 from the first group of points 611, while the rod moves along the extrusion direction E. Alternatively, the method comprises a plurality of steps of emitting, each performed by a dedicated emitter 62 and each associated with a respective inspection point of the first group of points 611.

In the step of inspecting, the rod slides along the extrusion direction E in a slide channel 641 of the inspecting device 6. The slide channel is exposed to the emitter 62 and to the receiver 63.

The emitter 62 is configured to emit X-rays (or the electromagnetic waves) in an inspection direction through a first window 642A which gives access to a transverse track 642 that intersects the slide channel 641. The X-rays travel along the transverse track 642 and pass through the rod B which conditions them differently according to the composition of the material the rod is made of.

The X-rays exit the transverse track 642 through a second window 642B, facing the receiver 63. The X-rays are then captured by the receiver 63. In an embodiment, the receiver 63 derives the inspection data 71 as a function of the X-rays captured.

In an embodiment, the method comprises a step of controlling, in which a control unit 7 controls parts of the machine 1 as a function of the inspection data. In the step of controlling, the inspecting device 6 sends the inspection data 71 to the control unit 7. The control unit 7 processes the inspection data 71. The control unit generates corresponding command signals 72. The control unit sends the command signals 72 to the cutting element 4 and/or to the pickup device 32 and/or to the rotary disc 31 and/or to the feeder 3.

In a particularly advantageous embodiment, where the rod B is of the type with the second material M2 extruded intermittently, the inspection data 71 represent the positions of the cutting zones along the extrusion direction E.

Thus, the control unit 7 generates the command signals 72 in such a way that the cutting element 4 makes the cut at the cutting zones ZT.

The method comprises a step of rejecting in which a rejection station, located downstream of the rotary carousel 2, rejects moulded objects that do not conform to quality standards. In this embodiment, the control unit 7 sends the command signals 72 to the rejection station to instruct it to reject any objects found to be defective on the basis of the inspection data 71.

The invention claimed is:

1. A compression moulding machine for making an object of polymeric material, comprising:
   an extrusion unit configured to extrude a rod of pasty polymeric material;
   a cutting element, configured to portion the rod into individual charges;
   at least one mould configured to receive a respective charge and to form a corresponding object from the charge;
   a feeder, configured to convey each charge to the at least one mould at a feed position, and
   an inspecting device, having an emitter configured to emit a beam of electromagnetic waves, and a receiver, configured to receive absorption data representing the absorption of the electromagnetic waves by the rod or the charge, the inspecting device being configured to capture inspection data, representing one or more chemical or physical properties a composition of the rod or of the charges,
   wherein the extrusion unit includes:
   a first extruder, configured to extrude a first pasty material;
   a second extruder, configured to extrude a second pasty material; and
   a co-extruder, configured to receive the first material and the second material from the first extruder and the second extruder, respectively, and to extrude the rod, which comprises the first material and the second material,
   wherein the inspecting device is configured to detect a presence of the second material in the rod,
   wherein the co-extruder is configured to extrude the second material intermittently in the rod along an extrusion direction to define portions of the second material spaced along the extrusion direction, and
   wherein the inspection data represent an absence of the second material at specific inspection points on the rod.

2. The machine according to claim 1, wherein the inspection points include a first group of points, located on the outside of the second material along a direction transverse to the extrusion direction, and second group of points, interposed between two successive portions of the second material along the extrusion direction.

3. The machine according to claim 1, comprising a control unit, configured to receive the inspection data from the inspecting device, and wherein the control unit is configured to control the cutting element as a function of the inspection data to command the cutting element to cut the rod at a section without the second material.

4. The machine according to claim 1, wherein the inspecting device is configured to inspect the rod at a position upstream of the cutting element.

5. The machine according to claim 1, wherein the inspection device is configured to detect electromagnetic waves emission or absorption by the rod or the charge.

6. The machine according to claim 5, wherein the inspecting device is configured to direct electromagnetic waves at the rod or at the charge and to detect the extent to which the electromagnetic waves are absorbed by the rod or by the charge.

7. The machine according to claim 6, wherein the inspecting device comprises an emitter, configured to emit electromagnetic waves, and a receiver, configured to receive electromagnetic waves, and wherein the inspecting device comprises a slide channel in which the rod is slidable, and a transverse track, perpendicular to the slide channel and aligned with the emitter and with the receiver along a direction of emission.

8. The machine according to claim 6, wherein the electromagnetic waves are X-rays having a wavelength of between 10 nm and 1 pm.

9. The machine according to claim 1, wherein the cutting element is disposed on the feeder and comprises a retaining surface configured to keep hold of the charge obtained by portioning the rod.

10. The machine according to claim 1, wherein the inspecting device is configured to inspect a plurality of inspection points on the rod and to derive corresponding inspection data for each of the inspection points.

11. The machine according to claim 10, wherein the plurality of inspection points includes a first group of points spaced from each other along a transverse direction, perpendicular to an extrusion direction, along which the rod exits the extrusion unit.

12. The machine according to claim 10, wherein the plurality of inspection points includes a second group of points spaced from each other along an extrusion direction along which the rod exits the extrusion unit.

13. The machine according to claim 10, wherein the plurality of inspection points defines an uninterrupted inspection line along the extrusion direction.

14. The machine according to claim 1, comprising a rotary carousel and an additional mould to form a plurality of moulds mounted on the rotary carousel.

15. The machine according to claim 1, wherein the rod and/or the charge includes a first material and a second material and wherein the inspection device is configured to detect the presence of at least one of said first and second material of the rod and/or of the charge.

16. A method for making an object of polymeric material by compression moulding, the method comprising the following steps:
   extruding a rod of pasty polymeric material by means of an extrusion unit;
   cutting the rod into individual charges;
   feeding the charge to at least one mould at a feed position;
   forming the object by moulding the individual charges in the at least one mould; and
   inspecting, wherein an inspecting device captures inspection data, representing a composition of the rod or of the charges,
   wherein, in the step of extruding, the rod is extruded with a first pasty material and with a second pasty material and
   wherein, in the step of inspecting, the inspecting device detects the presence of the second material in the rod, wherein, in the step of extruding, the second material is included in the rod intermittently along an extrusion direction along which the rod exits the extrusion unit to define portions of the second material spaced along the extrusion direction, and wherein, in the step of inspecting, the inspecting device detects an absence of the second material at specific inspection points on the rod.

17. The method according to claim 16, wherein, in the step of inspecting, the inspecting device emits electromagnetic waves and detects the extent to which the electromagnetic waves are absorbed by the rod or charges.

18. The method according to claim 17, wherein, in the step of inspecting, electromagnetic waves are emitted whose wavelength is between 10 nm and 1 pm.

19. A compression moulding machine for making an object of polymeric material, comprising:
   an extrusion unit configured to extrude a rod of pasty polymeric material;
   a cutting element, configured to portion the rod into individual charges;
   at least one mould configured to receive a respective charge and to form a corresponding object from the charge;
   a feeder, configured to convey each charge to the at least one mould at a feed position,
   an inspecting device having an emitter configured to emit a beam of electromagnetic waves, and a receiver, configured to receive absorption data representing the absorption of the electromagnetic waves by the rod or the charge, the inspecting device being configured to capture inspection data, representing one or more chemical or physical properties a composition of the rod or of the charges,
   wherein the electromagnetic waves are X-rays having a wavelength of between 10 nm and 1 pm.

20. A compression moulding machine for making an object of polymeric material, comprising:
   an extrusion unit configured to extrude a rod of pasty polymeric material;
   a cutting element, configured to portion the rod into individual charges;
   at least one mould configured to receive a respective charge and to form a corresponding object from the charge;
   a feeder, configured to convey each charge to the at least one mould at a feed position, and
   an inspecting device comprises an emitter configured to emit electromagnetic waves and a receiver configured to receive the electromagnetic waves, the inspecting device being configured to capture inspection data, representing a composition of the rod or of the charges,
   wherein the inspection device is configured to detect electromagnetic waves emission or absorption by the rod or the charge, wherein the inspecting device is configured to direct electromagnetic waves at the rod or at the charge and to detect the extent to which the electromagnetic waves are absorbed by the rod or by the charge, and
   wherein the inspecting device comprises a slide channel in which the rod is slidable, and a transverse track, perpendicular to the slide channel and aligned with the emitter and with the receiver along a direction of emission.

21. A method for making an object of polymeric material by compression moulding, the method comprising the following steps:
   extruding a rod of pasty polymeric material by means of an extrusion unit;
   cutting the rod into individual charges;
   feeding the charge to at least one mould at a feed position;
   forming the object by moulding the individual charges in the at least one mould, and
   inspecting, wherein an inspecting device captures inspection data, representing a composition of the rod or of the charges,
   wherein, in the step of inspecting, electromagnetic waves are emitted whose wavelength is between 10 nm and 1 pm.

* * * * *